United States Patent
Roesner

(10) Patent No.: US 6,229,443 B1
(45) Date of Patent: May 8, 2001

(54) APPARATUS AND METHOD FOR DETUNING OF RFID TAG TO REGULATE VOLTAGE

(75) Inventor: Bruce B. Roesner, San Diego, CA (US)

(73) Assignee: Single Chip Systems, San Diego, CA (US)

( * ) Notice: Subject to any disclaimer, the term of this patent is extended or adjusted under 35 U.S.C. 154(b) by 0 days.

(21) Appl. No.: 09/602,280

(22) Filed: Jun. 23, 2000

(51) Int. Cl.$^7$ ...................................... G08B 13/14
(52) U.S. Cl. ................... 340/572.1; 340/662; 340/663; 340/825.54; 361/56
(58) Field of Search ................ 340/572.1, 662, 340/663, 825.54; 361/56; 342/44; 343/5

(56) References Cited

U.S. PATENT DOCUMENTS

| | | | |
|---|---|---|---|
| 3,688,207 | * 8/1972 | Morris | 330/4 |
| 4,333,072 | * 6/1982 | Beigel | 340/825.54 |
| 5,103,222 | * 4/1992 | Hogen Esch et al. | 340/825.54 |
| 5,305,008 | * 4/1994 | Turner et al. | 342/44 |
| 5,313,198 | * 5/1994 | Hirao et al. | 340/825.54 |
| 5,815,355 | * 9/1998 | Dawes | 361/56 |
| 5,963,144 | * 10/1999 | Kruest | 340/825.54 |
| 6,014,088 | * 1/2000 | Van Santbrink et al. | 340/825.54 |
| 6,025,780 | * 2/2000 | Bowers | 340/572.3 |
| 6,104,333 | * 8/2000 | Wood, Jr. | 341/173 |

* cited by examiner

Primary Examiner—Jeffery Hofsass
Assistant Examiner—Phung Nguyen
(74) Attorney, Agent, or Firm—Daniel L. Dawes, Esq.; Myers, Dawes & Andras LLP

(57) ABSTRACT

Overload protection is provided to the tuned receiving front end circuitry of an RFID tag by selectively detuning the tuned receiving front end in response to sensed voltage overload generated across the tuned receiving front end by a high field. The tuned receiving front end is or is modeled as a tuned parallel inductor and capacitor tank circuit. A parallel capacitance is added to the tank circuit by means of a control transistor which is controlled by a voltage sensing circuit. The voltage sensing circuit senses the voltage being applied across the tank circuit and turns on the control transistor to a degree to sufficiently detune the tank circuit so that the operating voltage across the tank circuit remains at or below a desired operating value or safe limit regardless of the value of the field in which the RFID tag is placed.

15 Claims, 1 Drawing Sheet

APPARATUS AND METHOD FOR DETUNING OF RFID TAG TO REGULATE VOLTAGE

BACKGROUND OF THE INVENTION

1. Field of the Invention

The invention relates to the field of radiofrequency identification (RFID) tags and in particular to protecting RFID tags against high field burn out or overload.

2. Description of the Prior Art

In the normal operation of an RFID label, a voltage is generated in a field by applying an AC signal to a tuned transmitting antenna in a reader (or coil for low frequency operation). An RFID tag receives the power through a tuned antenna (or coil) when placed in the proximity of the generated field. When the tag (receiver) is placed in close proximity to a reader (transmitter), the tag can receive so much power that the voltage on the RFID chip must be limited so as not to damage the RFID chip. Normally, this is accomplished by placing a DC regulator on the RFID chip. The regulator must be of sufficiently low impedance so as to control the voltage even when the power supplied from the reader might generate many volts.

For high frequency operation utilizing E field transmission, the voltages supplied to a chip might reach 15 or 20 volts while the chip is trying to regulate below 5 volts. Unfortunately, for low frequencies where coils are used to transmit energy utilizing H fields, the voltage on the front end of the chip can easily reach voltages in excess of 50 volts. Regulation by limiting the voltage to only a few volts can cause severe problems. For a typical coil impedance of 200 ohms and regulation at 5 volts means that the power sustained on the chip becomes greater than 1 watt. Without any heat sinking capabilities, a small RFID chip will literally burn up.

There are a few techniques which one can implement to minimize the problem. First, the chip can allow for higher voltage operation without drawing excessive currents. Unfortunately, more state of the art integrated circuit technologies allow only very low voltage operation. Placing a low current limited in series with the main circuitry of the chip is a possibility, but once again an active device such as a transistor cannot be built into the chip and sustain the high voltages. The other option is to place a passive device such as a resistor in series with the chip. However, operating the chip at low voltages (long read distances) becomes quite difficult if not impossible.

What is needed is an apparatus and method which overcomes the inadequacies of the prior art solutions.

BRIEF SUMMARY OF THE INVENTION

The invention is an improvement in a circuit for avoiding overload of RFID tags in high fields comprising a tuned receiving circuit, and a voltage sensing circuit coupled to the tuned receiving circuit to sense voltage developed across the tuned receiving circuit from the high fields. A transistor is coupled to and controlled by the voltage sensing circuit. A circuit element is selectively and controllably coupled by the transistor to the tuned receiving circuit to detune the tuned receiving circuit so that overload of the RFID tag in high fields is avoided.

In the illustrated embodiment the circuit element is a capacitor, particularly where the receiving tuned circuit comprises an inductor and capacitor in parallel circuit. However, it must be understood that any circuit element which is capable of or useful for detuning the tuned circuit may be substituted. The capacitor, which is coupled by the transistor to the tuned circuit, has a capacitance of the same order of magnitude as the capacitor in the tuned circuit. In particular, the capacitor has a capacitance approximately equal to that of the capacitor in the tuned circuit. The transistor is capable of being turned on gradually by the voltage sensing circuit.

The invention is also characterized as a method for avoiding overload of RFID tags in high fields comprising the steps of providing a tuned receiving circuit, and sensing a voltage generated across the tuned receiving circuit from the high fields. The tuned receiving circuit is selectively detuned in response to the sensed voltage so that overload of the RFID tag in high fields is avoided.

The step of selectively detuning the tuned receiving circuit in response to the sensed voltage comprises the step of increasing capacitance in the tuned receiving circuit. In the illustrated embodiment this step of increasing capacitance in the tuned receiving circuit comprises the step of coupling a detuning capacitor in parallel to the capacitance in the tuned receiving circuit. It must be understood, however, that many other equivalent methods of detuning the RFID tag could be substituted for the illustrated embodiment.

In the illustrated embodiment the step of coupling the detuning capacitor in parallel to the capacitance in the tuned receiving circuit comprises the step of gradually turning on and off a transistor in series with the capacitor. In particular, the step of increasing capacitance in the tuned receiving circuit comprises increasing the capacitance in the tuned receiving circuit by a factor of approximately two.

The step of selectively detuning the tuned receiving circuit in response to the sensed voltage detunes the tuned receiving circuit by a degree to keep the sensed voltage across the tuned receiving circuit at a predetermined operating voltage or less, which in the illustrated embodiment is five volts or less. In general the step of keeping the sensed voltage across the tuned receiving circuit at a predetermined operating voltage or less comprises detuning the tuned receiving circuit to a degree in proportion to how much the sensed voltage across the tuned receiving circuit is different than the predetermined operating voltage. In the case where the tuned receiving circuit is comprised of an inductor and capacitor in parallel, the step of detuning the tuned receiving circuit comprises the step of coupling a capacitance in parallel to the inductor by means of a series coupled transistor which is gradually turned on and off.

Although the illustrated invention has been briefly summarized as a method of steps, it is to be expressly understood that such reference is made only for the purpose of grammatical ease of expression and that the invention is not limited by the "step limitations" of 35 USC 112. The invention can be better visualized by turning to the following drawing.

Figure 1:
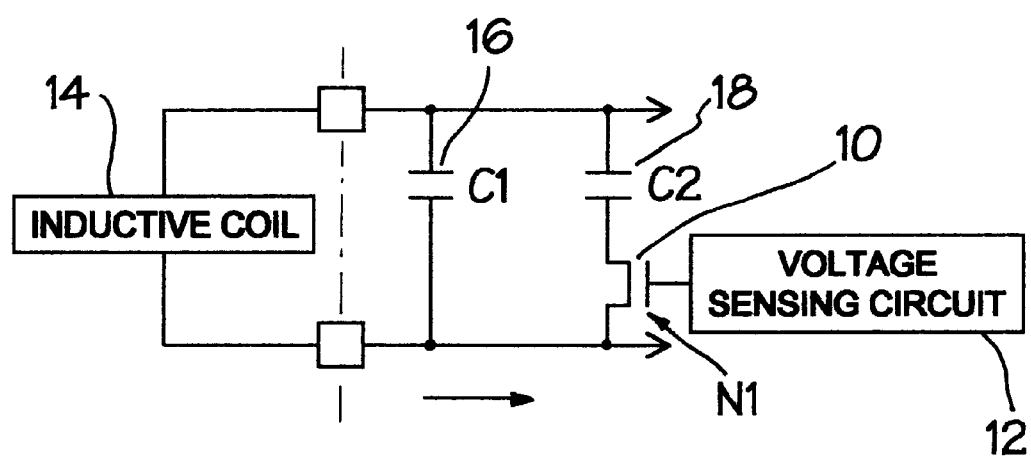
FIG. 1 is a simplified schematic of an improvement to an RFID tag circuit in which the receiving antenna or coil is selectively detuned to avoid high field burn out.

The invention and its various embodiments can be better understood by now turning to the following detailed description of the preferred embodiments.

DETAILED DESCRIPTION OF THE PREFERRED EMBODIMENTS

Overload protection is provided to the tuned receiving front end circuitry of an RFID tag by selectively detuning the tuned receiving front end in response to sensed voltage overload generated across the tuned receiving front end by a high field. The tuned receiving front end is or is modeled as a tuned parallel inductor and capacitor tank circuit. A parallel capacitance is added to the tank circuit by means of a control transistor which is controlled by a voltage sensing circuit. The voltage sensing circuit senses the voltage being applied across the tank circuit and turns on the control transistor to a degree to sufficiently detune the tank circuit so that the operating voltage across the tank circuit remains at or below a desired operating value or safe limit regardless of the value of the field in which the RFID tag is placed.

The method of the invention circumvents the problem by never allowing high voltages to develop on the RFID chip. The chip and associated antenna are usually tuned so that maximum voltages (maximum read distances) are accomplished. An improperly tuned front end of the label will severely reduce the voltage developed on the front end of the RFID chip. As an example, a tag coil operating at 30 MHz would typically require 15 pF of capacitance in parallel to properly tune the tag. For a given distance and transmitted power, the tag coil might generate 30 volts across its terminals. By adding an additional 15 pF in parallel with the coil, the voltage on the tag might only reach 1.5 volts under the same conditions. The extra capacitance severely reduces the incoming voltage. By placing a variable capacitor which is controlled by a voltage sensing circuit, the amount of de-tuning necessary for the tag to sustain high field strengths can be accomplished.

FIG. 1 is a schematic of a RFID chip's front end incorporating the invention. When the voltage is sensed by voltage sensing circuit 12 as being within typical operating limits, N channel control transistor 10 is turned off by voltage sensing circuit 12 and the capacitance in parallel with inductor 14 is sensed the value of capacitance 16. Voltage sensing circuit 12 senses the voltage being generated in coil 14 by means of monitoring the level of DC voltage internal to the chip and comparing it to a preset value. One way in which the voltage sensing can be realized is to provide a voltage from a resistor divider compared to a preset voltage level using a differential amplifier as voltage sensing circuit 12. A reference voltage is coupled to one input of a differential amplifier and the other input is coupled to a node that changes with the supply line. When the node that changes goes above the set voltage, the differential amplifier will change its output. That output is fed into subsequent circuitry that increases the voltage on the transistor in series with the detuning transistor, thereby detuning the circuit as described below. The design of voltage sensing circuit 12 is conventional and hence is not shown. The value of capacitance 16 is selected such that parallel inductor 14 and capacitor 16 provide a tuned circuit at the desired frequency of operation. There are some parasitic capacitances, but they can be made to be negligible. As the voltage increases above the typical operating voltage, transistor 10 is turned on by circuit 12. The higher the voltage sensed, the more transistor 10 is turned on which is essentially lowering the resistance in series with capacitance 18. When transistor 10 is fully turned on and its resistance is small in comparison to the impedance of capacitance 18, the total capacitance in parallel with inductor 14 is the sum of capacitances 16 and 18. Since the network was tuned with capacitance 16 in parallel, adding capacitance 18 will cause the network to be detuned and the voltage generated across inductor 14 is greatly reduced.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An improvement in a circuit for avoiding overload of RFID tags in high fields comprising:
    a tuned receiving circuit;
    a voltage sensing circuit coupled to said tuned receiving circuit to sense voltage developed across said tuned receiving circuit from said high fields;
    a transistor coupled to and controlled by said voltage sensing circuit; and
    a circuit element selectively and controllable coupled by said transistor to said tuned receiving circuit to detune said tuned receiving circuit so that overload of said RFID tag in high fields is avoided.

2. The improvement of claim 1 where said circuit element is a capacitor.

3. The improvement of claim 1 where said receiving tuned circuit comprises an inductor and capacitor in parallel circuit and where said circuit element is a capacitor.

4. The improvement of claim 1 where said capacitor coupled by said transistor to said tuned circuit has a capacitance of the same order of magnitude as said capacitor in said tuned circuit.

5. The improvement of claim 1 where said capacitor coupled by said transistor to said tuned circuit has a capacitance approximately equal to that of said capacitor in said tuned circuit.

6. The improvement of claim 1 where said transistor is capable of being turned on gradually by said voltage sensing circuit.

7. A method for avoiding overload of RFID tags in high fields comprising:

providing a tuned receiving circuit;

sensing a voltage generated across said tuned receiving circuit from said high fields; and selectively detuning said tuned receiving circuit in response to said sensed voltage so that overload of said RFID tag in high fields is avoided.

8. The method of claim 7 where said tuned receiving circuit comprises a inductor and capacitor in parallel and where selectively detuning said tuned receiving circuit in response to said sensed voltage comprises increasing capacitance in said tuned receiving circuit.

9. The method of claim 8 where increasing capacitance in said tuned receiving circuit comprises coupling a detuning capacitor in parallel to said capacitance in said tuned receiving circuit.

10. The method of claim 9 where coupling said detuning capacitor in parallel to said capacitance in said tuned receiving circuit comprises gradually turning on and off a transistor in series with said capacitor.

11. The method of claim 8 where increasing capacitance in said tuned receiving circuit comprises increasing said capacitance in said tuned receiving circuit by a factor of approximately two.

12. The method of claim 7 where selectively detuning said tuned receiving circuit in response to said sensed voltage detunes said tuned receiving circuit by a degree to keep said sensed voltage across said tuned receiving circuit at a predetermined operating voltage or less.

13. The method of claim 7 where selectively detuning said tuned receiving circuit in response to said sensed voltage detunes said tuned receiving circuit by a degree to keep said sensed voltage across said tuned receiving circuit at five volts or less.

14. The method of claim 12 where keeping said sensed voltage across said tuned receiving circuit at a predetermined operating voltage or less comprises detuning said tuned receiving circuit to a degree in proportion to how much said sensed voltage across said tuned receiving circuit is different than said predetermined operating voltage.

15. The method of claim 14 where said tuned receiving circuit is comprises of an inductor and capacitor in parallel and where detuning said tuned receiving circuit comprises coupling a capacitance in parallel to said inductor by means of a series coupled transistor which is gradually turned on and off.

* * * * *

Disclaimer

6,229,443 B1 - Bruce B. Roesner, San Diego, CA (US). APPRATUS AND METHOD FOR DETUNING OF RFID TAG TO REGULATE VOLTAGE. Patent dated May 8, 2001. Disclaimer filed March 7, 2016, by the assignee, Neology, Inc.

I hereby disclaim the following complete claims 1-15 of said patent.

*(Official Gazette, September 6, 2022)*

(12) INTER PARTES REVIEW CERTIFICATE (348th)
United States Patent (10) Number: US 6,229,443 K1
Roesner (45) Certificate Issued: Feb. 6, 2018

(54) APPARATUS AND METHOD FOR DETUNING OF RFID TAG TO REGULATE VOLTAGE

(75) Inventor: Bruce B. Roesner

(73) Assignee: NEOLOGY, INC.

Trial Number:

IPR2015-00808 filed Feb. 26, 2015

Inter Partes Review Certificate for:

Patent No.: 6,229,443
Issued: May 8, 2001
Appl. No.: 09/602,280
Filed: Jun. 23, 2000

The results of IPR2015-00808 are reflected in this inter partes review certificate under 35 U.S.C. 318(b).

INTER PARTES REVIEW CERTIFICATE
U.S. Patent 6,229,443 K1
Trial No. IPR2015-00808
Certificate Issued Feb. 6, 2018

AS A RESULT OF THE INTER PARTES REVIEW PROCEEDING, IT HAS BEEN DETERMINED THAT:

Claims 1-15 are cancelled.

\* \* \* \* \*